United States Patent [19]
Keel et al.

[11] Patent Number: 5,566,038
[45] Date of Patent: Oct. 15, 1996

[54] THIN FILM MAGNETIC HEAD HAVING CORE TO COIL OVER-VOLTAGE PROTECTION

[75] Inventors: Beat G. Keel, Prior Lake; Brian G. Ehalt, Orono; Raymond W. Knight, Chanhassen, all of Minn.

[73] Assignee: Seagate Technology, Inc., Scotts Valley, Calif.

[21] Appl. No.: 430,310

[22] Filed: Apr. 28, 1995

Related U.S. Application Data

[63] Continuation of Ser. No. 268,835, Jun. 29, 1994, abandoned, which is a continuation of Ser. No. 62,667, May 13, 1993, abandoned.

[51] Int. Cl.⁶ .................................. G11B 5/60; G11B 5/40
[52] U.S. Cl. ............................................ 360/103; 360/128
[58] Field of Search ................................... 360/103, 122, 360/123–126, 97.01–97.02; 369/126, 128

[56] References Cited

U.S. PATENT DOCUMENTS

| | | | |
|---|---|---|---|
| 4,317,149 | 2/1982 | Elser et al. | 360/126 |
| 4,800,454 | 1/1989 | Schwarz et al. | 360/103 |
| 4,841,395 | 6/1989 | Craft | 360/103 |
| 4,972,286 | 11/1990 | Jurisch et al. | 360/126 |
| 5,001,591 | 3/1991 | Nakashima | 360/126 |
| 5,048,175 | 9/1991 | Jursich et al. | 29/603 |
| 5,142,425 | 8/1992 | Gailbreath, Jr. et al. | 360/128 |

FOREIGN PATENT DOCUMENTS

| | | | |
|---|---|---|---|
| 0100841 | 2/1984 | European Pat. Off. | 360/126 |
| 2-46512 | 2/1990 | Japan | 360/126 |

Primary Examiner—John H. Wolff
Assistant Examiner—Brian E. Miller
Attorney, Agent, or Firm—Westman, Champlin & Kelly, P.A.

[57] ABSTRACT

A thin film transducer having electrical connections for the discharge of electrostatic charges between coil and core is disclosed. The invention provides for conductive surfaces electrically connected to the coil and core, respectively. These surfaces are selectively positioned so as to define an air gap having a breakdown voltage below that of the insulation layer separating coil and core in the transducer.

16 Claims, 5 Drawing Sheets

THIN FILM MAGNETIC HEAD HAVING CORE TO COIL OVER-VOLTAGE PROTECTION

REFERENCE TO CO-PENDING APPLICATION

This is a continuation of application Ser. No. 08/268,835, filed Jun. 29, 1994, now abandoned, which was a continuation of Ser. No. 08/062,667, filed May 13, 1993, now abandoned.

FIELD OF THE INVENTION

The present invention relates to recording heads employed in data storage devices, particularly to thin film magnetic transducers used in such heads.

BACKGROUND OF THE INVENTION

Data storage devices may employ thin film magnetic transducers positioned proximate the surface of a magnetic storage medium such as hard disk or tape. Hard disk drive data storage devices typically use thin film magnetic transducers carried on a somewhat conductive ceramic slider. The slider is designed for aerodynamic suspension above a rigid rotating disk so as to position the transducer magnetic core tips as closely as possible to the surface magnetic coating of the disk.

A typical read/write head includes a magnetic core having an air gap to record magnetic transitions in the medium surface during a write operation and to sense such transitions during a read operation. The core is magnetically linked to a coil. Electrical current in the coil during a write operation generates magnetic flux in the core to record transitions in the surface magnetic coating of a disk or other medium. During a read operation a voltage is induced in the coil as recorded transitions pass the air gap. Insulating layers electrically isolate the coil, core and supporting structure, such as a slider, from each other.

The core defines pole tips which are exposed at a surface opposing the storage medium. In a disk drive head, for example, the pole tips are positioned on the air bearing surface of the slider. It is desirable to minimize the distance between the storage medium surface and the pole tips, this distance is typically maintained at or below a few microinches. Coil electrical potential typically differs from that of the recording medium. Pole tip potential must be kept close to that of the medium to prevent electrical discharge across the small air gap separating the medium surface from the pole tips. Such discharge produces electrical noise which interferes with the read operation and damages the pole tips and medium thereby reducing operational reliability. Coil to disk voltage is typically not at or near zero during write/read operations.

The impedance of the insulation separating coil and core must be high to prevent the core pole tips from reaching coil potential. The breakdown voltage of coil to core insulation is typically below 1000 volts. Such insulation is therefore sensitive to overvoltages accidentally applied during fabrication, head installation, and shipping. Core-to-coil insulators are easily damaged during fabrication, installation and use. For example, electrostatic charges can build up on the conductors of the magnetic circuits of the transducer, especially during head fabrication, and arc from coil to core and core to support structure causing pole tip erosion and damaging the core to coil insulating layer thereby lowering coil-to-core impedance. Once such impedance is lowered, the core will assume coil potential, eventually resulting in undesired head to disk contact. State of the art semiconductors are often protected from electrostatic discharge damage by means of voltage limiting diodes.

It is an object of the present invention to provide overvoltage protection of core to coil insulation using discharge means through a small air gap.

SUMMARY OF THE INVENTION

The present invention provides a first conductive surface electrically connected to the coil and a second conductive surface electrically connected to the core. The first and second conductive surfaces are separated so as to define an air gap there between. The distance between the first and second surfaces is selected to facilitate the formation of an electrical arc through the air gap at a voltage, i.e. the breakdown voltage $V_{bd}$ of the air gap, of approximately 500 volts or less. The area of facing surfaces is sufficiently large to keep the impedance of the electrical arc small, preferably below 1000 Ohms, so as to facilitate the discharge of large charges applied to coil or core as the voltage between coil and core exceeds the breakdown voltage $V_{bd}$ of approximately 500 volts or less.

Other objects and advantages of the present invention will become apparent from the following description taken in conjunction with the accompanying drawings and attached claims.

Figure 1:
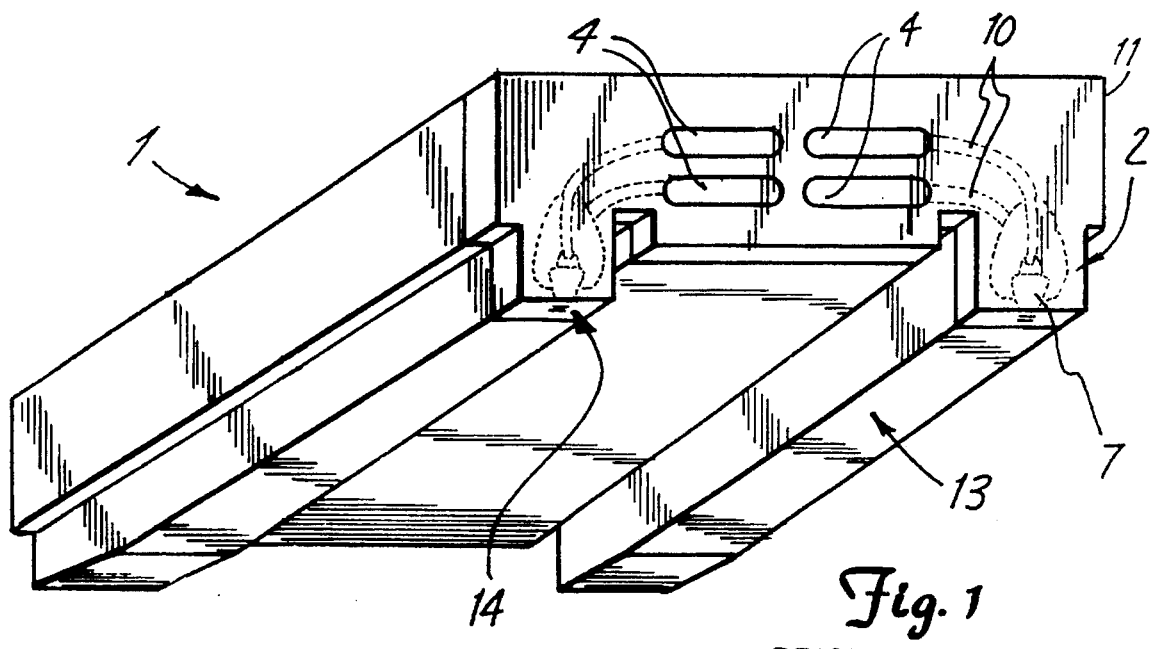
FIG. 1 is a perspective view of a prior art slider having a pair of thin film magnetic read/write heads integrally formed thereon.
Figure 2:
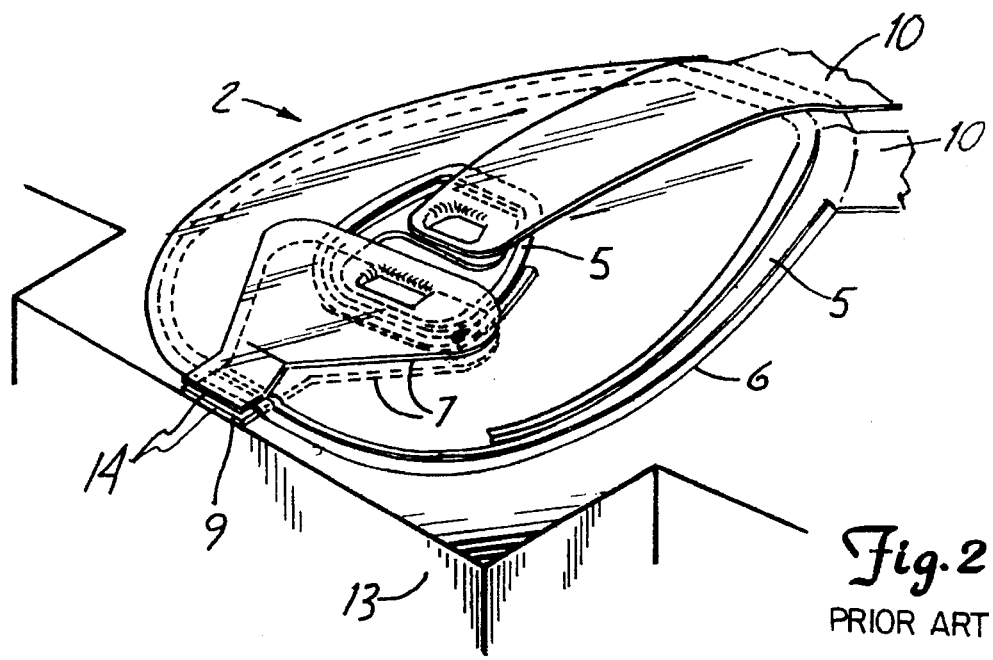
FIG. 2 is a perspective view of a magnetic read/write head of FIG. 1.
Figure 3:
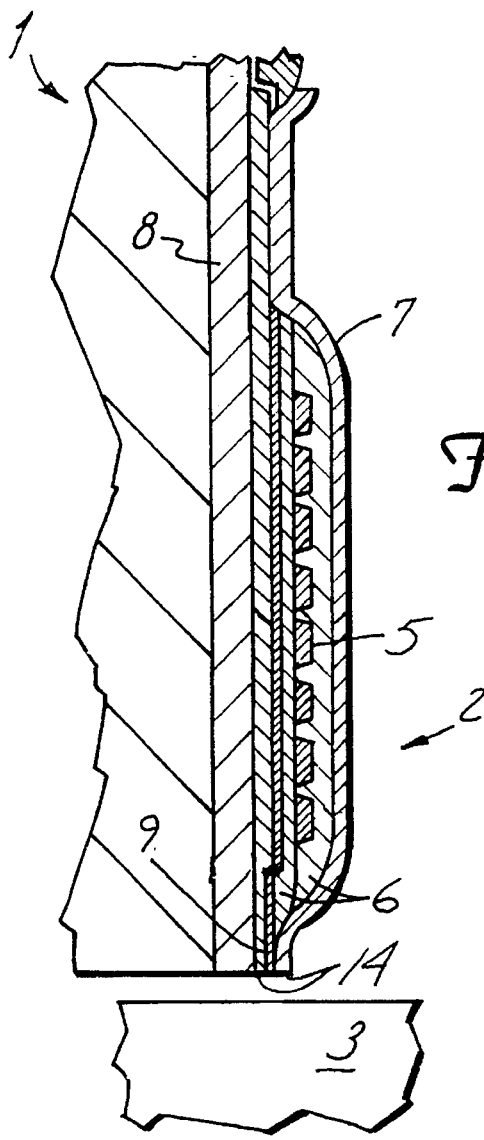
FIG. 3 is a side cross-sectional view of a portion of the magnetic read/write head of FIG. 2.
Figure 4:
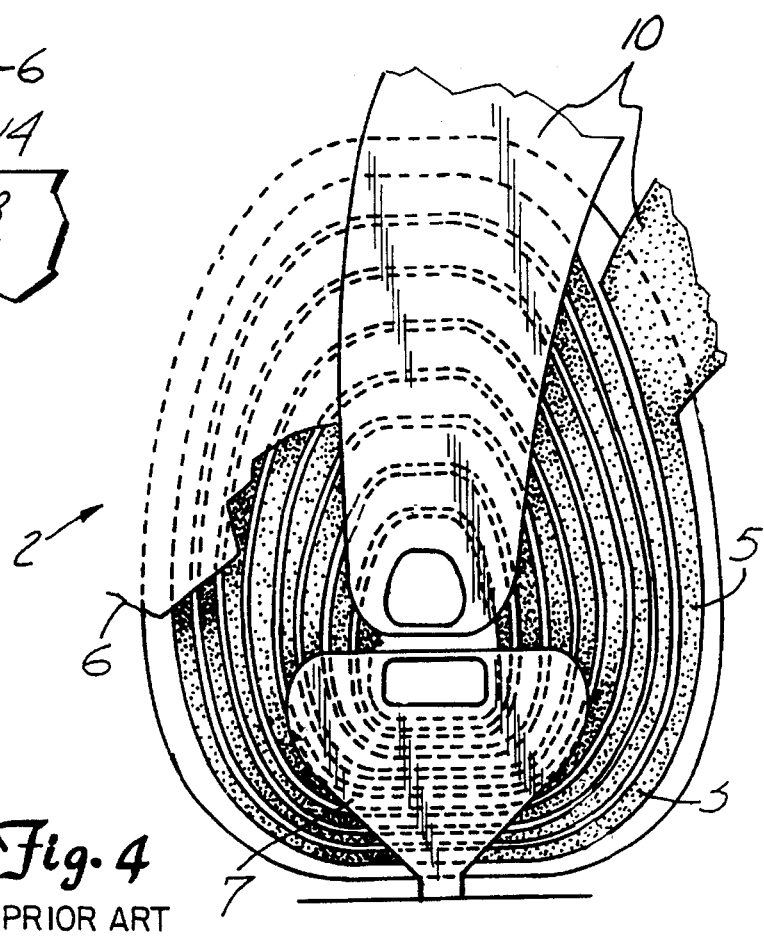
FIG. 4 is a plan view of a magnetic read/write head of FIG. 2.

The invention, together with further objects and advantages thereof, may best be understood by reference to the following description taken in conjunction with the accompanying drawings.

DESCRIPTION OF THE INVENTION

Typically, thin film magnetic recording heads 2 are mounted onto or fabricated integrally with an electrically conductive support structure 1. Magnetic core 7 is electrically conductive and possesses high magnetic permeability. Core 7 terminates in a pair of pole tips 14 separated by recording gap 9. Tips 14 are exposed at air bearing surface 13 opposite recording medium 3. Coil linkages 10 extend the ends of coil 5 to a pair of terminals 4. Coil 5 is separated from core 7 by insulator 6. Core 7, coil 5, coil terminals 4 and coil linkages 10 are all typically encapsulated by insulating overcoat layer 11 and, adjacent support structure 1, by insulator layer 8.

When resistivity between coil 5 and core 7 is low, charges can leak through insulator 6 to the core which then assumes an electrical potential different from the potential of recording medium 3. Since core pole tips 14 are close to the medium surface, electrical discharge between tips 14 and medium 3 can occur thereby creating intermittent electrical noise and read errors.

In disk drives, for example, tips 14 are separated from the disk surface by only about 2 to 4 micro inches. Further, material may transfer between the medium and pole tips during such electrical discharge leading to destruction of the head-medium interface and deterioration of reliability. In disk drive applications, disk surface media may transfer to pole tips 14 during such discharge resulting in potentially damaging head to disk contact.

The spacing between coil 5 and core 7 generally exceeds 2 microns. Insulator 6 typically provides over 10 megaohms of core to coil impedance with a breakdown voltage $V_{bd}$ of over 500 volts. However, electrostatic discharge during head fabrication, shipping or installation can generate thousands of volts between coil and core, the discharge of which can destroy head installation.

Prior art lightning rod schemes such as that disclosed in Craft, U.S. Pat. No. 4,841,395, the disclosure of which is hereby incorporated by reference, are directed to limiting the voltage between the coil and transducer support structure, not the voltage between the coil and core. Other schemes, such as those disclosed in Schwarz, U.S. Pat. No. 4,800,454 and Jursich et al., U.S. Pat. No. 4,972,286, the disclosures of which are also hereby incorporated by reference, attempt to maintain the core at the same potential as the support structure thus preventing arcing between the pole tips and medium, not to protect core to coil insulation.

Figure 5:
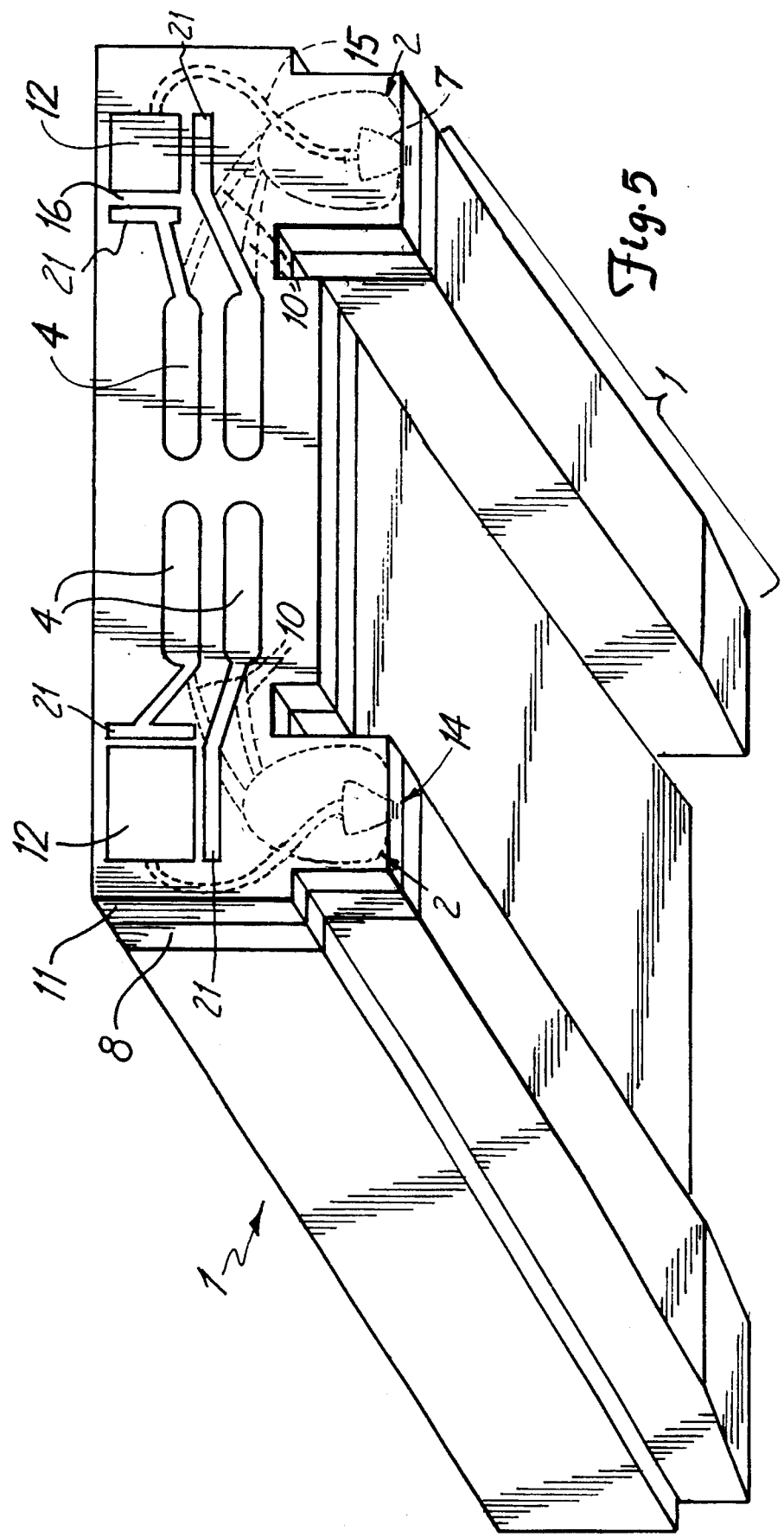
FIG. 5 is a perspective view of a slider depicting a first embodiment the present invention.
Figure 6:
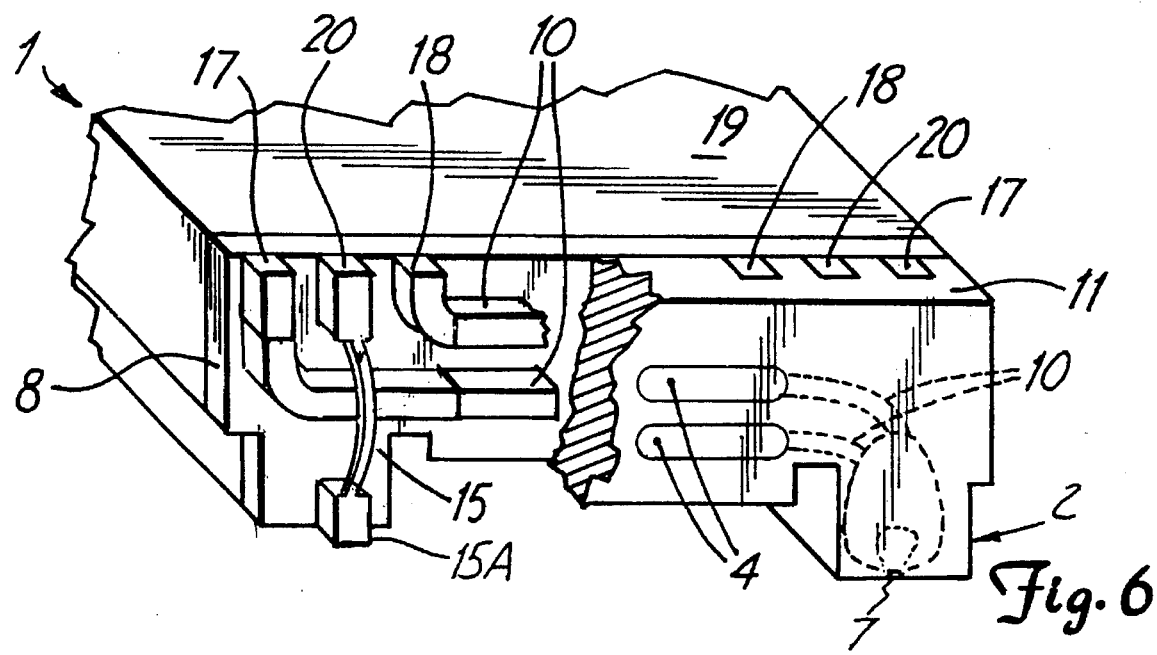
FIG. 6 is a perspective view of a slider depicting a second embodiment the present invention.
Figure 7:
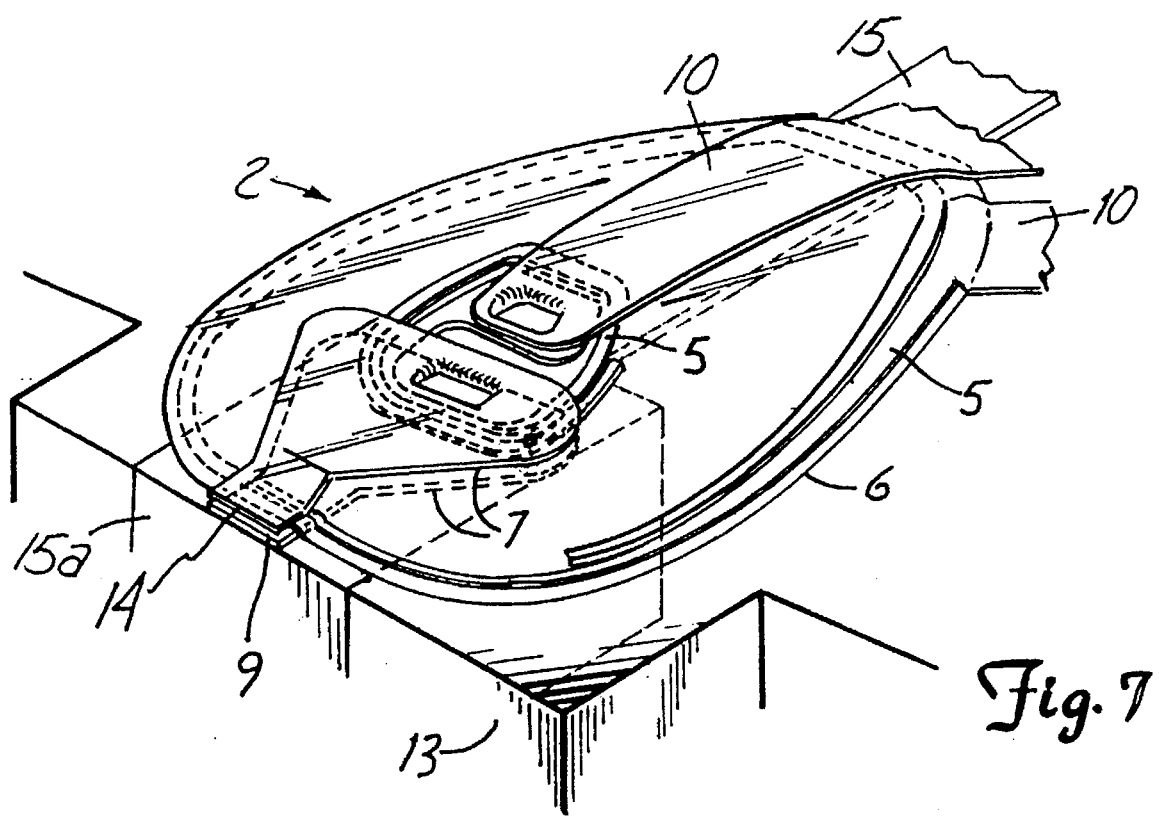
FIG. 7 is a perspective view of a magnetic read/write head including a connection to the core in accordance with the present invention.

FIGS. 6 and 7 show two embodiments of the present invention. The invention may be coupled to prior art thin film magnetic heads as depicted in FIGS. 1 through 4. For simplicity and to facilitate the description of the present invention, FIGS. 5 and 6 show the thin film heads with dashed lines and leave out a number of details. These details are identified by referring to FIGS. 1 through 4.

FIG. 5 depicts a first embodiment of the present invention in an inductive read/write head for disk storage applications. A core terminal 12 and extension terminals 21 are terminated atop overcoat insulator 11 and are exposed to air. Thus, core terminal 12 and extension terminal 21 define voltage limiting discharge airgaps 16 atop overcoat insulator 11. Core terminal 12 is connected to core 7 by core link 15. The electrical connection of coil terminals 4 to respective coil linkages 10. The distance of approximately 3 to 10 microns between core terminal 12 and the extension of terminals 21 is selected to provide a desired breakdown voltage of between 100 to 500 Volts. Gap 16 is preferably formed in air, not in a solid medium, so as to avoid the accumulation of electrically conductive deposits at either terminal which reduce core to coil impedance and thereby defeat an objective of the present invention.

The area of core terminal 12 and extension terminals 21 is sufficiently large to keep the impedance of the electrical arc small, preferably below 1000 ohms, so as to facilitate the discharge of large charges applied to coil or core as the voltage between coil and core exceeds the breakdown voltage of approximately 500 volts or less. Charge on extension terminals 21 are conducted away from extension terminals 21 using known techniques.

Airgap 16 protects the core to coil insulation even during repeated occurrences of charges transfers to coil or core induced by electrostatic discharge. This is accomplished by providing an air gap at both the start and end of the coil and the core terminal to provide protection independent of which side of the coil charge is applied and independent of coil inductance.

FIG. 6 illustrates a second embodiment of the present invention as applied to an inductive read/write head of a disk storage device. Core 7 is connected to link 15 which is exposed to air as a cross section terminal 20 on a finely machines surface 19 not facing recording medium 3. Similarly, each link 10 is electrically connected to a respective end of coil 5, not shown, and exposed to air as cross section terminals 17, 18 on surface 19. In FIG. 6 exposed cross section terminals 17, 18, 20 are shown on the right side of the drawing and the partial cut away view on the left side depicts deposited features prior to deposition of overcoat layer 11. Spacing between 17 and 20 and 18 and 20 is substantially equivalent to the distance between core terminal 12 and the extension terminal 21 of FIG. 5. The surfaces of cross section pairs 17,20 and 18,20 are not in three dimensional opposition, however each adjoining pair facilitates arcing substantially within the plane surface 19 at a voltage below 500 Volts thus protecting core to coil insulation 6. As in FIG. 5, cross sections 17, 18, 20 are exposed to air so as to facilitate electrical discharge without depositing a low impedance leakage path between coil and core.

FIG. 7 is a perspective view of a magnetic recording head 2. FIG. 7 also shows the connection between core 7 and conductive link 15 shown in FIGS. 5 and 6.

Although the present invention is described with reference to specific embodiments, persons skilled in the art will recognize that changes may be made in form and detail without departing from the spirit and scope of this invention. The two illustrated embodiments deal with insulation between coil and core, however the spirit of the invention includes other applications in magnetic recording data storage devices, for example shield to write coil insulation in magnetoresistive read head.

What is claimed is:

1. A thin film magnetic head assembly, comprising:

a slider adapted to fly over a magnetic storage disc, the slider having an air bearing surface proximate the magnetic storage disc and a second surface;

a magnetic head carried on the slider, the magnetic head having a core and pole tips coupled to the core, the pole tips adjacent the air bearing surface, the magnetic transducing head including a conductive coil proximate the core for magnetic interaction with the core, the conductive coil having a first end and a second end;

a first coil linkage electrically connected to the first end of the conductive coil;

a second coil linkage electrically connected to the second end of the conductive coil;

core to coil insulation electrically insulating the coils from the core;

a first extension terminal carried on the second surface of the slider and electrically connected to the first coil linkage;

a second extension terminal carried on the second surface of the slider and electrically connected to the second coil linkage;

a core link electrically connected to the core of the magnetic head; and a core terminal electrically connected to the core link and carried on the second surface proximate the first extension terminal, wherein a gap between the core terminal and the first extension terminal is between 3 and 10 microns such that a potential between the core terminal and the first extension greater than an electrical breakdown voltage will result in an electrical arc therebetween and wherein the gap is spaced apart from the air bearing surface, whereby the gap between the core terminal and the first extension terminal discharges excess voltage from the magnetic head thereby protecting the core to coil insulation.

2. The thin film magnetic head assembly of claim 1 wherein the electrical breakdown voltage between the core terminal and the first extension terminal is less than about 500 volts.

3. The thin film magnetic head assembly of claim 1 wherein the surface area of the first extension terminal and the core terminal are selected to obtain an electrical arc impedance therebetween of less than about 1000 Ohms.

4. The thin film magnetic head assembly of claim 1 wherein the core terminal is positioned between 3 and 10 microns from the second extension terminal.

5. The thin film magnetic head assembly of claim 1 wherein the second surface is opposite the air bearing surface.

6. The thin film magnetic head assembly of claim 1 wherein the second surface is substantially perpendicular to the air bearing surface.

7. A thin film magnetic head assembly, comprising:

a slider adapted to fly over a surface of a magnetic storage disc, the slider having an air bearing surface proximate the magnetic storage disc and a second surface;

a magnetic head carried on the slider, the magnetic head having a core and pole tips coupled to the core, the pole tips adjacent the air bearing surface, the magnetic transducing head including a conductive coil proximate the core for magnetic interaction with the core, the conductive coil having a first end and a second end;

a first coil linkage electrically connected to the first end of the conductive coil;

a second coil linkage electrically connected to the second end of the conductive coil;

core to coil insulation electrically insulating the coils from the core;

a first extension terminal carried on the second surface of the slider and electrically connected to the second coil linkage;

a second extension terminal carried on the second surface of the slider and electrically connected to the second coil linkage;

a core link electrically connected to the core of the magnetic head; and a core terminal electrically connected to the core link and carried on the second surface of the slider proximate the first extension terminal, wherein a gap between the core terminal and the first extension terminal is between 3 and 10 microns and wherein the gap between the core terminal and the first extension terminal is selected such that an electrical breakdown voltage therebetween is less than about 500 volts and wherein the gap is spaced apart from the air bearing surface, whereby the gap between the core terminal and the first extension terminal discharges excess voltage from the magnetic head thereby protecting the core to coil insulation.

8. The thin film magnetic head assembly of claim 7 wherein the surface area of the first extension terminal and the core terminal are selected to obtain an electrical arc impedance therebetween of less than about 1000 Ohms.

9. The thin film magnetic head assembly of claim 7 wherein the core terminal is positioned between 3 and 10 microns from the second extension terminal.

10. The thin film magnetic head assembly of claim 7 wherein the second surface is opposite the air bearing surface.

11. The thin film magnetic head assembly of claim 7 wherein the second surface is substantially perpendicular to the air bearing surface.

12. A thin film magnetic head assembly, comprising:

a slider adapted to fly over a surface of a magnetic storage disc, the slider having an air bearing surface proximate the magnetic storage disc and a second surface;

a magnetic head carried on the slider, the magnetic head having a core and pole tips coupled to the core, the pole tips adjacent the air bearing surface, the magnetic head including a conductive coil proximate the core for magnetic interaction with the core, the conductive coil having a first end and a second end;

a first coil linkage electrically connected to the first end of the conductive coil;

a second coil linkage electrically connected to the second end of the conductive coil;

core to coil insulation electrically insulating the coils from the core;

a first extension terminal carried on the second surface of the slider and electrically connected to the first coil linkage;

a second extension terminal carried on the second surface of the slider and electrically connected to the second coil linkage;

a core link electrically connected to the core of the magnetic head;

a core terminal electrically connected to the core link and carried on the first surface of the slider proximate the first electrical terminal, wherein a gap between the core terminal and the first extension terminal is between 3 and 10 microns;

wherein the gap is spaced apart from the air bearing surface and wherein surface area of the core terminal and the first extension terminal are selected to obtain an electrical arc impedance therebetween of less than about 1000 Ohms, whereby the gap between the core terminal and the first extension terminal discharges excess voltage from the magnetic head thereby protecting the core to coil insulation.

13. The thin film magnetic head assembly of claim 12 wherein an electrical breakdown voltage between the core terminal and the first extension terminal is less than about 500 volts.

14. The thin film magnetic head assembly of claim 12 wherein the core terminal is positioned between 3 and 10 microns from the second extension terminal.

15. The thin film magnetic head assembly of claim 12 wherein the second surface is opposite the air bearing surface.

16. The thin film magnetic head assembly of claim 12 wherein the second surface is substantially perpendicular to the air bearing surface.

* * * * *